sed Oct. 7, 1969

3,471,310
WELDING PROCESS AND PRODUCT
A David Joseph, Wapping, Conn., and Daniel P. Tanzman, Far Rockaway, N.Y., assignors to Eutectic Welding Alloys Corporation, New York, N.Y., a corporation of New York
No Drawing. Filed May 24, 1965, Ser. No. 458,452
Int. Cl. C23c 17/00
U.S. Cl. 117—22                                22 Claims

ABSTRACT OF THE DISCLOSURE

A flame sprayable product comprising a metalliferous particle and a resin and flux coating on the particle. The metalliferous particle can be a metal or a metalloid. Processes for flame spraying with such particles.

---

This invention relates to a consumable product and, more particularly, to a consumable metal product having improved welding characteristics.

Heretofore, it has been known that consumable products utilized in the welding processes generally known as "metal spraying," as described in United States Patent No. 2,786,779, issued to A. Long et al., were limited to those alloy systems which had self-fluxing properties, such as, for example, those alloys containing nickel, boron and silicon, or nickel, boron, silicon and chromium alloys, certain cobalt and iron-base alloys modified with alloy additions of over one-half of one percent of boron, and copper-base alloys containing phosphorus and/or boron. Consequently, the metals that heretofore could be utilized in the metal spraying processes represented only a small percentage of the many metals and metal alloys that have been generally available. In addition, those self-fluxing alloys that could heretofore be successfully metal sprayed had inherent detrimental characteristics that limited their industrial application. Further, some alloys that contain volatile metal constituents, such as the brass alloys which contain zinc, and the silver solders which contain cadmium and/or zinc, are presently difficult to metal spray because of noxious fuming caused by the evaporation of the volatile constituents. In addition, the loss of the volatile constituents generally results in uncontrolled and fluctuating chemistries in the weld deposits. Further, and very important, is the fact that some of the presently known metal spraying processes cause the unprotected alloy passing through the flame to oxidize, resulting in the metal spraying weld deposits to contain substantial amounts of entrapped oxides. The entrapped oxides, which remain in the weld deposit even after extensive fusion during welding, diminish to a great extent the properties of adhesion to the base metal of the weld deposit as well as its properties of corrosion resistance, ductility and machinability. In addition, the extensive oxidation incurred by particles passing through the torch flame further limits the use of the type of alloys or other particles such as certain metalliferous carbide material, as for example, vanadium carbide, that can be metal sprayed. Moreover, heretofore in the welding deposits attained through the use of welding electrodes, considerable difficulties have been encountered in the quantities of the powder constituents contained in the electrode coatings being less in the metallic arc transfer and in maintaining nonconductive metallic electrode coatings.

It is the general object of the present invention to avoid and overcome the foregoing and other difficulties of and objections to prior art practices by the provision of a wide range of metalliferous materials, metals, metallic alloys and other particles for all types of metal spraying processes.

Another object of the present invention is to reduce oxidation in the metal spraying alloys that are passed through a flame.

Still another object of the present invention is to control the fluidity of the weld pool in the process of metal spraying and molten pool generation.

Yet another object of the present invention is to reduce noxious fuming in the metal spraying of alloys containing volatile metals.

Yet still another object of the present invention is to enable the metal spraying of alloys having low melting temperatures.

A further object of the present invention is to provide means for protecting particles passing through a torch flame.

The present invention also has as additional objects: to increase deposit efficiency of weld deposits; to eliminate substantially entrapped oxides in the weld deposits; to provide conductive-free electrode coatings; to provide clean welding rods free from surface contaminants; and to enable the metal spraying of non-self-fluxing alloys; and to substantially eliminate voids in the weld deposit.

The aforesaid objects of the present invention and other objects, which will become apparent as the description proceeds, are achieved by providing a consumable product made up of a metalliferous material, such as a metal, a resin deposited on the material and/or a flux mixed in with the resin. In addition, the objects of this invention are further achieved by the process of coating metal particles and flame spraying the particles.

Although the principles of the present invention are broadly applicable to any type of thermal application, the present invention is particularly adapted for use in conjunction with welding and, hence, it has been so illustrated and will be be so described.

Broadly stated, the invention resides in the discovery that coating of particles e.g. of the type sprayed through conventional metal spraying torches, such as that shown in United States Patent No. 2,786,779 issued to A. Long et al. and that shown in United States Patent No. 2,963,033 issued to K. W. Kenshol as hereinafter explained in detail with a thin decomposeable protective coating material, such as a resin type coating, results in the protection of the particles passing through the torch flame to the extent that it greatly diminishes the oxidation of such powders. This has resulted in the ability to spray certain metalliferous materials, such as vanadium carbide, which has a high propensity to oxidize. Further, such resin coating has been found to control the fluidity characteristics of the weld pool which is generated at the metal substrate during metal spraying. Another great advantage inherent in the use of resin-coated particles is the fact that the resin coating substantially inhibits the noxious fuming that has always heretofore hampered the metal spraying of zinc and certain of the silver bearing alloys.

In addition, this invention enables the deposition of a wide range of metals by the metal spraying process, and by the metal spraying and molten pool generation process that, prior to this discovery, were thought to be impossible to deposit. Consequently, this invention now makes it possible to employ the labor saving metal spraying processes in numerous industries that prior to this discovery were though to be unattainable.

One embodiment of the present invention contemplates the use of metal powders including alloy metal powders, coated with a thin coating of resin as follows:

EXAMPLES OF METALS AND ALLOYS

The following metals and alloys are given only as illustrative examples and are not intended in any manner to limit the metals and alloys that may be employed within the teachings and spirit of this invention.

(1) Copper.

(2) Copper-base alloys such as the following copper base alloys:

(a) Brasses comprising alloys, some of which are included in the range of compositions given below:

| Constituent | Percent |
|---|---|
| Copper | 60–95 |
| Zinc | 0.5–40 |
| Tin | 0–1 |
| Silicon | 0–4 |

(b) Bronzes comprising alloys some of which are in the range of compositions given below:

| Constituent | Percent |
|---|---|
| Copper | 80 to 98.75 |
| Tin | 1.25 to 20 |
| Silicon | 0 up to 4 |
| Zinc | 0 up to 4 |
| Iron | 0 up to 3 |
| Aluminum | 0 up to 2 |
| Manganese | 0 up to 2 |

(c) Cupro-nickel alloys some of which are in the range of compositions given below:

| Constituent | Percent |
|---|---|
| Copper | 60–92 |
| Nickel | 40–8 |
| Iron | 0–2 |

(d) Nickel-silver alloys some of which are in the range of compositions given below:

| Constituent | Percent |
|---|---|
| Copper | 15–75 |
| Nickel | 10–30 |
| Zinc | 10–42 |

(e) Silicon-bronze alloys some of which are in the range of compositions given below:

| Constituent | Percent |
|---|---|
| Copper | 90–99 |
| Silicon | 1–10 |

(f) Aluminum-bronze alloys some of which are in the range of compositions given below:

| Constituent | Percent |
|---|---|
| Copper | 75–96 |
| Aluminum | 4–16 |
| Iron | 0–3 |
| Silicon | 0–5 |
| Manganese | 0–1 |

(3) Nickel-base alloys such as the following:

(a) General nickel base alloys some of which are in the range of compositions given below:

| Constituent | Percent |
|---|---|
| Manganese | Up to 4.5 |
| Aluminum | Up to 4.5 |
| Silicon | Up to 1.5 |
| Nickel | Balance |

(b) Nickel-copper alloys some of which are in the range of composition given below:

| Constituent | Percent |
|---|---|
| Cooper | 28–31 |
| Aluminum | 0–3 |
| Silicon | 0–5 |
| Nickel | Balance |

(c) Nickel-chromium, iron alloys some of which are in the range of compositions given below:

| Constituent | Percent |
|---|---|
| Chromium | 5–40 |
| Iron | 5–25 |
| Silicon | 0–2 |
| Nickel | Balance |

(d) Nickel, molybdenum, chromium, iron alloys some of which are in the range of compositions given below:

| Constituent | Percent |
|---|---|
| Molybdenum | Up to 25 |
| Silicon | Up to 10 |
| Copper | Up to 3 |
| Chromium | Up to 25 |
| Iron | Up to 20 |
| Tungsten | Up to 4 |
| Nickel | Balance |

(e) Nickel, chromium, molybdenum, copper alloys some of which are in the range of compositions given below:

| Constituent | Percent |
|---|---|
| Chromium | 20–30 |
| Molybdenum | 5–10 |
| Copper | 3–7 |
| Nickel | Balance |

(f) Chromium-nickel alloys some of which are in the range of compositions given below:

| Constituent | Percent |
|---|---|
| Nickel | 20–75 |
| Carbon | Up to 2.5 |
| Silicon | Up to 2 |
| Iron | Balance |

(g) Nickel, boron, silicon alloys some of which are in the range of compositions given below:

| Constituent | Percent |
|---|---|
| Boron | Up to 5 |
| Silicon | Up to 6 |
| Iron | Up to 5 |
| Chromium | Up to 20 |
| Cobalt | Up to 3 |
| Copper | Up to 3 |
| Nickel | Balance |

(4) Iron-base alloys such as the following:

(a) Cast iron alloys some of which are in the range of compositions given below:

| Constituent | Percent |
|---|---|
| Carbon | 2–5 |
| Silicon | 0–4 |
| Manganese | 0–2 |
| Phosphorous | 0–1 |
| Iron | Balance |

(b) Abrasion resistant cast iron alloys some of which are in the range of compositions given below:

| Constituent | Percent |
|---|---|
| Carbon | 2–3.7 |
| Silicon | .25–1.6 |
| Manganese | .30–1.25 |
| Chromium | 0–30 |
| Nickel | 0–5 |
| Phosphorous | 0–4 |
| Iron | Balance |

(c) Corrosion resistant cast iron alloys some of which are in the range of compositions given below:

HIGH SILICON TYPE

| Constituent | Percent |
|---|---|
| Carbon | .4–1 |
| Silicon | 14–17 |
| Manganese | .4–1 |
| Molybdenum | 0–3.5 |
| Iron | Balance |

HIGH CHROMIUM TYPE

| Constituent | Percent |
|---|---|
| Carbon | 1.2–4 |
| Silicon | .5–3 |
| Manganese | .3–1.5 |
| Nickel | 1–5 |
| Chromium | 12–35 |
| Copper | 0–3 |
| Molybdenum | 0–4 |
| Iron | Balance |

HIGH NICKEL TYPE

| Constituent | Percent |
|---|---|
| Carbon | 1.5–3 |
| Silicon | 1–2.57 |
| Manganese | .4–1.5 |
| Nickel | 14–32 |
| Chromium | 1.75–5.5 |
| Copper | 0–7 |
| Molybdenum | 0–1 |
| Iron | Balance |

(d) Hard facing alloys some of which are in the range of compositions given below:

CHROMIUM, MOLYBDENUM, MANGANESE TYPE

| Constituent: | Percent |
|---|---|
| Carbon | .6–3.5 |
| Manganese | Up to 2 |
| Silicon | Up to 1 |
| Chromium | 3–7 |
| Nickel | Up to 3 |
| Molybdenum | Up to 3.5 |
| Vanadium | Up to 3.5 |
| Iron | Balance |

CHROME-MOLYBDENUM TYPES

| Constituent: | Percent |
|---|---|
| Carbon | .6–4.2 |
| Manganese | 0–3.5 |
| Silicon | 0–.7 |
| Chromium | 7–15 |
| Nickel | 0–4.6 |
| Molybdenum | 0–.90 |
| Tungsten | 0–3.5 |
| Vanadium | 0–1 |
| Iron | Balance |

MOLYBDENUM, VANADIUM, CHROMIUM TYPES

| Constituent: | Percent |
|---|---|
| Carbon | .8–3.6 |
| Manganese | .9–4.7 |
| Molybdenum | 5.6–15.3 |
| Vanadium | 0–2.4 |
| Boron | 0–1.4 |
| Iron | Balance |

CHROMIUM, NICKEL, MOLYBDENUM TYPES

| Constituent: | Percent |
|---|---|
| Carbon | 2.1–3.9 |
| Manganese | 0–.9 |
| Silicon | 0–1.2 |
| Chromium | 18–32 |
| Molybdenum | 0–6 |
| Vanadium | 0–1.5 |
| Cobalt | 0–6 |
| Iron | Balance |

COBALT, CHROMIUM TYPES

| Constituent: | Percent |
|---|---|
| Carbon | 2.3–3.6 |
| Manganese | 0–.6 |
| Silicon | 0–1.6 |
| Chromium | 15.4–16 |
| Nickel | 0–6 |
| Molybdenum | 0–3.1 |
| Cobalt | 2–20 |
| Iron | Balance |

(e) Cobalt, chrome, tungsten alloys some of which are in the range of compositions given below:

| Constituent: | Percent |
|---|---|
| Carbon | 1.1–3.2 |
| Manganese | 0–.25 |
| Silicon | .3–1.5 |
| Chromium | 24–33 |
| Tungsten | 5–19 |
| Nickel | 0–25 |
| Cobalt | Balance |

(f) High speed steels some of which alloy types are in the range of compositions given below:

TUNGSTEN TYPES

| Constituent: | Percent |
|---|---|
| Carbon | .7–1.5 |
| Chromium | 4–4½ |
| Tungsten | 12–20 |
| Vanadium | 1–5 |
| Cobalt | 0–12 |
| Iron | Balance |

MOLYBDENUM TYPES

| Constituent: | Percent |
|---|---|
| Carbon | .8–1.5 |
| Chromium | 0–4 |
| Molybdenum | 3.5–8 |
| Tungsten | 1.5–6 |
| Vanadium | 1–5 |
| Cobalt | 0–12 |
| Iron | Balance |

(5) Aluminum.
(6) Aluminum alloys as follows:
(a) Aluminum-silicon alloys some of which are in the range of compositions given below:

| Constituent: | Percent |
|---|---|
| Silicon | 4–12 |
| Copper | 0–5 |
| Aluminum | Balance |

(b) Aluminum-manganese alloys some of which are in the range of compositions given below:

| Constituent: | Percent |
|---|---|
| Manganese | Up to 10 |
| Copper | Up to 5 |
| Nickel | Up to 2.5 |
| Silicon | Up to 12 |
| Zinc | Up to 2 |
| Aluminum | Balance |

(7) Silver base alloys some of which are in the range of compositions given below:

| Constituent: | Percent |
|---|---|
| Silver | 15–95 |
| Copper | Up to 40 |
| Zinc | Up to 40 |
| Cadmium | Up to 25 |

In addition to the foregoing metals, the invention is also applicable to such other metals as zinc, cadmium, indium, lead, tin and zinc-base, cadmium-base, indium-base, lead-base and tin-base alloys; to chromium and chromium-base alloys, as well as to platinum, palladium, ruthenium, indium and their base alloys.

As stated hereinbefore, the invention is likewise applicable to certain metalliferous materials such as particles of vanadium carbide. Generally, such materials are comingled or mixed with matrix metal powders, for example, nickel, iron, cobalt or their alloys or other metals and alloys recited herein and the mixture flame sprayed to produce a matrix metal coating having the carbide dispensed through the deposited matrix metal. Examples of metalliferous materials that may be employed in conjunction with matrix metal powders are oxides, carbides, silicides, nitrides and borides of the refractory metals, vanadium, columbium, tantalum, titanium, zirconium, hafnium, chromium, molybdenum, tungsten, etc.

EXAMPLES OF RESINS

The following resins are given only as illustrative examples and are not intended in any manner to limit the resins that fall within the teachings and spirit of this invention. These materials are characterized in that they are decomposable at the flame spraying temperatures.

(1) Thermosetting resins such as the following which in and of themselves are completely known by those skilled in the art:

(a) Silicones
(b) Phenolics
(c) Epoxies
(d) Polyesters.

(2) Thermoplastic resins such as the following which in and of themselves are completely known by those skilled in the art:

(a) Vinyls
(b) Acrylics
(c) Polyolefines
(d) Fluorinated polyolefines
(e) Synthetic rubbers.

It will now be understood that this embodiment of the invention entails the application to sprayable particles of a thin coating of resin. The proportions of resin to be combined with specific quantities of sprayable particles e.g. metal particles, has been found to be controlled by the specific gravities of the resin and metal utilized, by the surface area of the particles to be coated and by the volume of such particles to be coated. The proportions of resin to be added to the metal particles for best results have been determined to fall in the ranges outlined by the following formulas:

$$\text{Minimum percent resin by weight} = \tau K_1 \frac{P_r}{P_m}$$

$$\text{Maximum percent resin by weight} = \tau K_2 \frac{P_r}{P_m}$$

where:

$K_1 = 0.67 \times 10^{-4}$ inches,
$K_2 = 167 \times 10^{-4}$ inches,
$P_r$ = specific gravity of the resin,
$\tau$ = surface area to volume ratio of metal particles to be coated in units of reciprocal inches,
$P_m$ = specific gravity of the metal particles.

It will further be understood by those skilled in the art that for uniform coverage of the resins on the metal particle surface, the resins can be solvated in a compatible liquid, such as for example alcohol. The metallic particles can be coated with the resin by many well known ways, such as, for example, the metallic particles and the solvated resin can be intermixed in a standard blender. In addition, heat can be provided to allow the resin coatings on the metallic particle surface to set and form a bond.

Another embodiment of this invention contemplates the combination of a resin-flux mixture as a thin coating on the metal and metal alloy particles. It has been found that such a resin-flux coating on metal particles imparts all of the advantages of the invention outlined hereinbefore and in addition imparts improved self-fluxing properties to the metal particles. Further, the addition of flux to the resin coating on the metal particles insures wetting of the sprayed coating to the base metal or substrate, particularly when such metal particles are deposited by flame spraying processes, or by the combination of metal spraying and molten pool generation. It will be understood that a metal particle coated with a resin-flux mixture will be protected from oxidation as it passes through the torch flame and also that the resin-flux coated particles will make effective use of the flux properties due to the positioning of the flux around the metal particles to impart its properties to the metal particle. Still further, it has been observed that the resin-flux coating applied to the metal particles provide protection to the molten pool surface against oxidation. Yet further, the flux additions substantially eliminate voids in the weld deposit thus eliminating a problem that has been long plaguing the industry.

This embodiment of the invention enables the use of the various metals and alloys mentioned hereinbefore coated with a thin layer of one of the resins decsribed and listed hereinbefore, including the use of fluxes combined with the resin coating. Examples of fluxes that can be utilized in accordance with the invention are as follows:

EXAMPLES OF FLUXES

The following fluxes are given only as illustrative examples and are not intended in any manner to limit the fluxes that fall within the teachings and spirit of this invention. The general chemical composition of these fluxes are well known in the art.

(1) Borates, such as calcium borate, sodium borate and potassium borate.
(2) Fused borax.
(3) Fluo-borates, such as calcium, sodium and potassium fluo-borates.
(4) Fluorides, such as calcium and lithium fluorides.
(5) Chlorides, such as potassium and nickelous chlorides.
(6) Acids, such as boric acid.
(7) Alkalies.
(8) Nitrates, such as sodium nitrate.
(9) Carbonates, such as calcium carbonate.

The quantities of the fluxes to be mixed with the resins and the metal particles are determined as follows:

(1) The percentage ranges of the resin to be used are determined in accordance with the following formulas:

$$\text{Minimum percent resin by weight} = \tau K_1 \frac{P_r}{P_m}$$

$$\text{Maximum percent resin by weight} = \tau K_2 \frac{P_r}{P_m}$$

where:

$K_1 = 0.67 \times 10^{-4}$ inches
$K_2 = 167 \times 10^{-4}$ inches
$P_r$ = specific gravity of the resin
$\tau$ = surface area to volume ratio of metal particles to be coated in units of reciprocal inches
$P_m$ = specific gravity of the metal particles.

(2) The amount of flux to be mixed in with the resin is as follows:

(a) For non-self-fluxing metal particles, it has been found that the amount of flux to the weight of the metal particles to be used may range broadly from about .050 to 5% by weight with the range of about .1 to 1% by weight particularly advantageous for the purpose.

(b) For self-fluxing metal particles, it has been found that the amount of flux to the weight of the metal particles to be used may range from about .01 to 1% by weight with the range of about .1 to 1% by weight advantageous for the purpose.

The fluxes can be combined with resin in many ways; for example, the fluxes can be entrapped in the resin coating adhering to the surface of the metal particles or the fluxes if soluble can be dissolved in a soluble resin or dispensed throughout it.

Another embodiment of this invention contemplates the coating flux particles with a resin coating. There have been many attempts in flame metal spraying processes to mix flux particles with the metal particles in order to impart to the metal spray fluidity and wettability characteristics. However, such mechanical mixtures of flux and metals have not been too successful due to the differences in specific gravities which cause the constituents of the mixture to segregate during feeding of the mixture through a welding torch. In addition, many fluxes have deliquescent properties which cause the flux to become moist, thereby reducing the flowability of the mixture. Another problem associated with the use of fluxes is that some fluxes, when passing through the torch flame unprotected, are burned out before reaching the weld pool. In addition, the variance in the specific gravities between the flux and the metal particles causes stratification therebetween which makes it difficult to ship these mixtures.

It has been discovered that the coating of the flux particles with resin allows the coated flux particles to be mechanically mixed with metal particles so that the characteristics and advantages of the flux can be effectively utilized with various metal alloy particles in the production of consumable products for use in various metal spraying processes. Further, and most important, a thin coating of resin on flux particles serves to protect the flux and prevent it from being burned off as the mixture of the metal particles and the coated flux particles are passed through the flame of a welding torch in a flame spraying process, thus allowing the flux particles to reach the weld pool without losing their effectiveness. Still further, the resin coating of the flux prevents the flux from picking up moisture and also diminishes the separation of the flux particles from the metal particles, while insuring the flame spraying of uniform proportions of flux and metal particles. In addition, it has been discovered that the resin coating of the flux particles substantially inhibits stratification of the flux particles from metal particle mixtures. This embodiment of the invention, therefore, comprises welding consumables comprising mechanical mixtures of metal particles and resin coated flux particles for use in various types of welding flame spraying processes, such as metal spraying, or metal spraying with molten pool generation. The metal particles of the mixture can be any of the elemental metals or alloys as outlined hereinbefore. Likewise, the fluxes and resin coatings to be utilized are those outlined hereinbefore and their equivalents. The resin coating can be applied to the flux by any number of ways well known in the art, such as by mixing a resin, such as solvated phenolic resin with a borate type flux, for example, a calcium borate, in a standard agitation type blender to coat the flux surfaces with a thin coating of the resin followed by the application of sufficient heat to set the resin. The heat is applied gradually taking care that the temperature within the blender never exceeds the resin setting temperature.

The proportions of resin to be combined with specific quantities of flux has been found to be controlled by the specific gravities of the resin and flux utilized, by the surface area of the particles to be coated and by the volume of such particles being coated. The proportions of resin and flux found to give the best results have been determined to fall in the ranges in accordance with the following formulas:

$$\text{Minimum percent resin by weight} = \tau K_1 \frac{P_r}{P_f}$$

$$\text{Maximum percent resin by weight} = \tau K_2 \frac{P_r}{P_f}$$

where:

$K_1 = 0.67 \times 10^{-4}$ inches.
$K_2 = 167.00 \times 10^{-4}$ inches.
$P_r$ = specific gravity of the resin.
$P_f$ = specific gravity of the flux particles.
$\tau$ = surface area to volume ratio of the flux particles to be coated in units of reciprocal inches.

It must be explained here that the term "particles" as used herein denotes the particle sizes generally used in the various processes in the flame spraying art, for example, particle sizes ranging to finer than 400 mesh; or the term may include cut wire particles.

Another embodiment of the present invention comprises the coating of a thin layer of the resin hereinbefore described on filler rods utilized in the tungsten inert gas process. The tungsten inert gas weld has long been plagued by the imperfections caused by dirt that is accumulated on the tungsten inert gas rods. In fact, field welders often subject the rods to special cleaning processes before such rods are used. It has been found that the coating of the tungsten inert gas rods with a light resin coating insures a degree of cleanliness required for good welding properties. The resin coating is substantially volatilized by the welding arc and consequently does not effect the weld pool.

In modern welding procedures, it is known that small flux additions to tungsten inert gas rods effectively aid the welding process. Such flux additions can now be made by incorporating the flux in the resin coatings in the proportions set forth hereinbefore.

Still another embodiment of the present invention is to resin coat and/or to resin and flux coat conductive materials, such as graphite, utilized in various types of standard welding electrode coatings. The welding industry has long been plagued by the so called conductive electrode coatings, that is coatings with such conductive properties that allow the current of welding to flow therethrough. The conductive properties in the coatings are, of course, created by conductive additives in the coatings and such conduction of current cause the coatings to become overheated, thus adversely affecting the coating properties. Further, such conductive coatings cause the welding current to arc-off or short out at various points in the coating, which not only causes a dangerous condition but also reduces the current available for the welding process. Still further such coatings substantially eliminate the interreaction of the coated particles in the electrode coating with other material present in the electrode coating.

It will now be understood that the resin and/or resin and flux coating of such conductive additives to the coating in effect insulates such additives and renders them non-conductive. Further, the resin and/or resin and flux coating of the electrode additives will substantially reduce the moisture accumulation tendencies of the electrode coatings, thus increasing both the efficiency of the weld deposits and the shelf life of such electrodes.

A further alternative embodiment of the present invention is the embodiment of the hereinbefore described resin-coated metal particles, resin and flux coated metal particles, and mixtures of metal particles with resin-coated flux particles, either severally or in various combinations thereof in various welding tubular products. It will be understood that this embodiment applied to tubular products will impart to the tubular products all of the advantages described herein, such as increasing the utility of the various metalliferous materials including the elemental metals and alloys hereinbefore described and such as improving the fluxing properties and the fluidity and wettability of the sprayed material deposited, as well as improving the quality of the weld pool. Additional advantages include the effective and substantial elimination of the moisture collecting properties that such rods are susceptible to increased shelf life.

It is apparent from the disclosure, the invention is applicable to a large number of metalliferous materials, including metals and alloys having low melting points and those having relatively high melting points. With regard to the flame spraying of metals of high melting point, for example, certain of the more refractory metals and alloys, the metal substrate receiving such metals generally have melting points not lower than 500° F. below the temperature of the molten metal deposited on the substrate.

In referring to such metals as Cu and Cu-base alloys, Ni and Ni-base alloys, Fe and Fe-base alloys, etc., it is to be understood that the copper, or nickel, or iron in such base alloys are each the chief ingredient. Thus, in such alloys, the element constituting the chief ingredient makes up at least about 40% by weight of the alloy and is present in greater amount than any other single ingredient present in the alloy.

As stated hereinbefore, the resin is effective even when used alone without the fluxing agent. This is particularly the case where the resin is employed as a coating on metals having self-fluxing properties. While the resin may be also employed effectively as a coating on a non-fluxing metal particle, we find it advantageous for our purposes in obtaining optimum results to combine a flux with the resin.

Further alternatively the resin and metal particle combination and/or the resin, flux and metal particle combinations can be effectively utilized in formed compacts which compacts comprise mixtures of metal and metal alloy particles such as nickel and cobalt which serve as matrices, and carbide particles that are formed under great pressure and then are processed through a normal type of sintering process.

The resin, and the resin and flux, coating of the matrix materials impart to the green compact greater green strength and in addition aid the flow and wettability characteristics of such matrix materials during the sintering process. In addition, the resin coating of the particles substantially diminish the dielectric properties of the various particle compositions. Similarly resin coated metal particles and resin-flux coated metal particles can be effectively utilized in the compact forming of strip and/or rod welding materials.

It will be recognized by those skilled in the art that the objects of the present invention have been achieved by providing a welding consumable product allowing greater utility and versatility that has been heretofore available in fields of application, manner of application, resultant weld pool properties and product life before use.

We claim:

1. A powder comprising a boron-free metal powder selected from the group consisting of the metals and alloys of Cu, Ag, Au, Fe, Co, Ni, Pd, Ru, Rh, Zn, Al, and Cr; and a resin and flux mixture adhering to said metal powder.

2. The article of manufacture of claim 1 wherein said cobalt base alloy particles have the following constituents in the weight percentages indicated:

| Constituent: | Percent |
|---|---|
| Carbon | 1.1–3.2 |
| Manganese | 0–0.25 |
| Silicon | 0.3–1.5 |
| Chromium | 24–33 |
| Tungsten | 5–19 |
| Nickel | 0–25 |
| Cobalt | Balance |

3. A consumable flame-sprayable product comprising a metal particle and a resin and flux mixture adhering to said metal particle.

4. A welding process comprising the steps of providing metal particles with a decomposable protective coating adhering to the particles and flame-spraying said particles.

5. A welding process comprising the steps of providing metal particles with a resin adhering to said particles, and flame-spraying said particles.

6. A welding process comprising the steps of mixing a resin with a flux to form a resin and flux mixture, causing said mixture to adhere to metal particles and flame-spraying said particles.

7. A welding process comprising the steps of dissolving a flux in a resin, causing the mixture to adhere to metal particles, and flame-spraying said metal particles.

8. A welding process comprising the steps of mixing a flux in a resin to form a mixture, causing said mixture to adhere to metal particles, and heating said metal particles.

9. As an article of manufacture, a consumable product comprising a resin and flux mixture adhering to metal particles selected from the group consisting of Cu, Ag, Au, Cu-base, Ag-base and Au-base alloys; Fe, Co, Ni, Fe-base, Co-base, and Ni-base alloys; Pt, Pd, Ru, Rh, In and Pt-base, Pd-base, Ru-base, Rh-base, and In-base alloys; Zn, Cd, Al, In, Pb, Sn and Zn-base, Cd-base, Al-base, In-base, Pb-base and Sn-base alloys; Cr and Cr-base alloys.

10. A tubular rod filled with a consumable product comprising a metalliferous particle and a resin and flux mixture adhering to said particle.

11. A welding electrode with a coating comprising metalliferous particles in the coating and resin adhering to said particles.

12. A consumable flame-sprayable product comprising a metal particle and a thermoset resin and flux mixture adhering to said particle.

13. A consumable flame-sprayable product comprising a particle of a boron free alloy and a resin and flux mixture adhering to said particle.

14. A consumable flame-sprayable free-flowing product comprising a particle of a substantially boron free alloy and a mixture of a thermoset resin and flux adhering to said particle.

15. A consumable flame sprayable product comprising a particle of a non-self fluxing metal and a resin and flux mixture adhering to said particle wherein the flux is present in an amount equal to 0.05 to 5 percent by weight based on the weight of the particle and wherein the minimum amount of resin is given by the formula:

$$\tau K_1 \frac{P_r}{P_f}$$

and the maximum amount of resin is given by the formula:

$$\tau K_2 \frac{P_r}{P_f}$$

wherein:

$K_1 = 0.67 \times 10^{-4}$ inches
$K_2 = 167.00 \times 10^{-4}$ inches
$P_r$ = the specific gravity of the resin
$P_f$ = the specific gravity of the flux particles
$\tau$ = the surface area to volume ratio of the metal particles to be coated in units of reciprocal inches.

16. As an article of manufacture a consumable free flowing product comprising cobalt base alloy particles and a thermoset resin-flux mixture adhering to said alloy particles.

17. In a method for depositing a metal powder in the form of a weld deposit on a base metal, the improvement comprising providing the metal powder with a resin and flux mixture adhering thereto and depositing said metal powder by flame spraying, whereby said flux in said resin mixture wets the base metal to permit the weld depositing of the metal powder on the base metal.

18. A method for flame-spraying non-self-fluxing alloys comprising admixing flame-spraying gases with alloy particles having a resin and flux mixture adhering thereto.

19. A method for flame-depositing a weld deposit on a base metal comprising admixing flame-spraying gases with metal particles having a thermoset resin and flux mixture adhering thereto and projecting the gases and the particles onto the base metal to form a weld deposit.

20. A consumable flame-sprayable product comprising a particle of a metalloid and a thermoset resin and flux mixture adhering to said particle.

21. The product of claim 20 wherein the metalloid is vanadium carbide.

22. As an article of manufacture, a consumable product comprising a metalliferous particle selected from the group consisting of Cu, Ag, Au, Cu-base, Ag-base and Au-base alloys; Fe, Co, Ni, Fe-base, Co-base, and Ni-base alloys; Pt, Pd, Ru, Rh, In and Pt-base, Pd-base, Ru-base, Rh-base and In-base alloys; Zn, Cd, Al, In, Pb, Sn and Zn-base, Cd-base, Al-base, In-base, Pz-base and Sn-base alloys; Cr and Cr-base alloys and oxides, carbides, silicides, nitrides and borides of refractory metals; and a resin and flux mixture adhering to said metal particles.

References Cited

UNITED STATES PATENTS

| 2,943,951 | 7/1960 | Haglund | 117—22 |
| 2,744,040 | 5/1956 | Altman | 117—100 |
| 2,774,747 | 12/1956 | Wolfson et al. | 117—100 |
| 3,004,872 | 10/1961 | Stark | 117—202 |
| 3,153,584 | 10/1964 | Goon | 117—100 |
| 3,185,589 | 5/1965 | Damm | 117—100 |

FOREIGN PATENTS 609,644  10/1948  Great Britain.

WILLIAM L. JARVIS, Primary Examiner

U.S. Cl. X.R.

106—1; 117—100, 105; 148—23; 260—29.1